United States Patent [19]

Gladney et al.

[11] Patent Number: 4,714,996
[45] Date of Patent: Dec. 22, 1987

[54] IMPACT CALCULATION FOR VERSION MANAGEMENT IN A DISTRIBUTED INFORMATION SERVICE

[75] Inventors: Henry M. Gladney, Saratoga; Douglas J. Lorch; Richard L. Mattson, both of San Jose, all of Calif.

[73] Assignee: International Business Machines Corporation, Armonk, N.Y.

[21] Appl. No.: 801,896

[22] Filed: Nov. 26, 1985

[51] Int. Cl.$^4$ .............................................. G06F 9/00
[52] U.S. Cl. ..................................................... 364/300
[58] Field of Search ................ 364/200 MS File, 300

[56] References Cited

U.S. PATENT DOCUMENTS

| | | | |
|---|---|---|---|
| 4,432,057 | 2/1984 | Daniell et al. | 364/300 |
| 4,558,413 | 12/1985 | Schmidt et al. | 364/300 |
| 4,620,276 | 10/1986 | Daniell et al. | 364/200 |

OTHER PUBLICATIONS

IEEE Transactions on Computers, vol. C-34, No. 6, Jun. 1985, "The Exclusive-Writer Approach to Updating Replicated Files in Distributed Processing Systems", by Chu et al.
ACM Transactions on Database Systems, 5(1)U, 1-17, 1980, "Introduction To a System for Distributed Databases (SDD-1)" by Rothnie et al.
ACM Proceedings SIGMOD, 228-237, 1983, "Overview of an ADA Compatible Distributed Database Manager", by Chan et al.
ACM Proceedings SIGMOD, 30-39, 1983, "On the Design of a Query Strategy in a Distributed Database Environment", by Yu et al.
ACM Transactions on Database Systems, 7(2), 209-234, 1982, "Read-Only Transactions in a Distributed Database", by Garcia-Molina et al.

Primary Examiner—Raulfe B. Zache
Attorney, Agent, or Firm—Mark A. Haynes; Simon K. Lee

[57] ABSTRACT

In a distributed processing system having a source node accessing data objects from a database and a replica node storing replicas of requested source data objects received from the source location, the impact to replicas caused by a change in a source data object is calculated by assigning a version number to the change. An identifier of the portion of the source database affected by the change is generated, as well as a list of replicas containing objects from the affected portion of the database. For a replica location communicating with the source location, a table of the replicas from the list is then recorded along with the version number for communicating to the replica location.

16 Claims, 20 Drawing Figures

IMPACT CALCULATION FOR VERSION MANAGEMENT IN A DISTRIBUTED INFORMATION SERVICE

CROSS-REFERENCE TO RELATED APPLICATION

U.S. patent application Ser. No. 801,897, entitled COMMUNICATION FOR VERSION MANAGEMENT IN A DISTRIBUTED INFORMATION SERVICE, filed on the same day, owned by a common assignee and having the same inventors as the present case.

FIELD OF THE INVENTION

The present invention relates to managing versions of data objects stored in a plurality of nodes of a distributed processing system. More particularly, the present invention relates an apparatus and method for managing obsolete versions of data objects at nodes of a distributed system.

BACKGROUND OF THE INVENTION

Distributed processing systems that are made up of intelligent workstations adapted to access central databases at source locations are being adapted to a growing number of applications. In many of these applications, a given workstation may require access to a single data object from some source database more than once. This requires much duplication of effort by the systems managing the database and the network.

To reduce this duplication of effort, it is desirable to maintain replicas of frequently accessed data objects at the workstation using such data objects to enhance responsiveness at the workstation, to improve availability of the communication channels by preventing repeated requests for the same object and to reduce costs. However the use of storage systems at the workstation locations which maintain replicas of frequently accessed data aggravates the problem of data obsolescence. If data in the central database is changed, then replicas of that data stored at workstation locations become obsolete. Therefore a system to manage obsolete data at workstations is necessary.

In a distributed information service having a large number of workstations that retrieve replicas of data objects from source databases, there often exists a complex mapping from the source data objects to the replicas stored at individual workstations. When there is no simple relation between the data stored in replica locations and the data in the source databases, a problem of identifying the impact of a change in a source data object upon a set of replicas in the information service arises. Prior methods for calculating and storing data concerning the impact of a source data change for later access by individual replica locations involve the communication of any change in a source database to invalidate replicas at all replica locations in the system. Obviously, communicating source data updates to all replica locations in the system, whether or not they are likely to be affected by the source data change, results in a large amount of unnecessary communication between workstations in a system.

SUMMARY OF THE INVENTION

The present invention teaches an efficient and general method for calculating and propagating the impact of source data changes in systems in which consistency with respect to the data objects is required only at a given location for the duration of a given transaction.

The inventive method operates in a system for managing obsolescence of replicas of data objects, the objects being utilized in multiple nodes of a distributed processing system. At least one node in the distributed processing system operates as an object source location having access to source data objects in a source database and at least one other node operates as an object replica location having means for storing replicas of a requested object received from a source location. The method for calculating the impact of a change to a source data object within the system described herein comprises the steps of:

responsive to the change in the source data object, assigning a version number to the change and generating an identifier of a portion of the source database affected by the change;

responsive to the generated identifier, generating a list of replicas formed from the affected portion of the source database; and for a replica location in communication with the source location recording a BADMESSAGES table of replicas in the list along with the version number assigned to the change for communication to the replica location.

The format of the list of identified replicas for the replica locations impacted by the source data change facilitates communication of the information to the replica locations in the system in a manner described in the above cross referenced application entitled COMMUNICATION FOR VERSION MANAGEMENT IN A DISTRIBUTED INFORMATION SERVICE.

DETAILED DESCRIPTION

Figure 1:
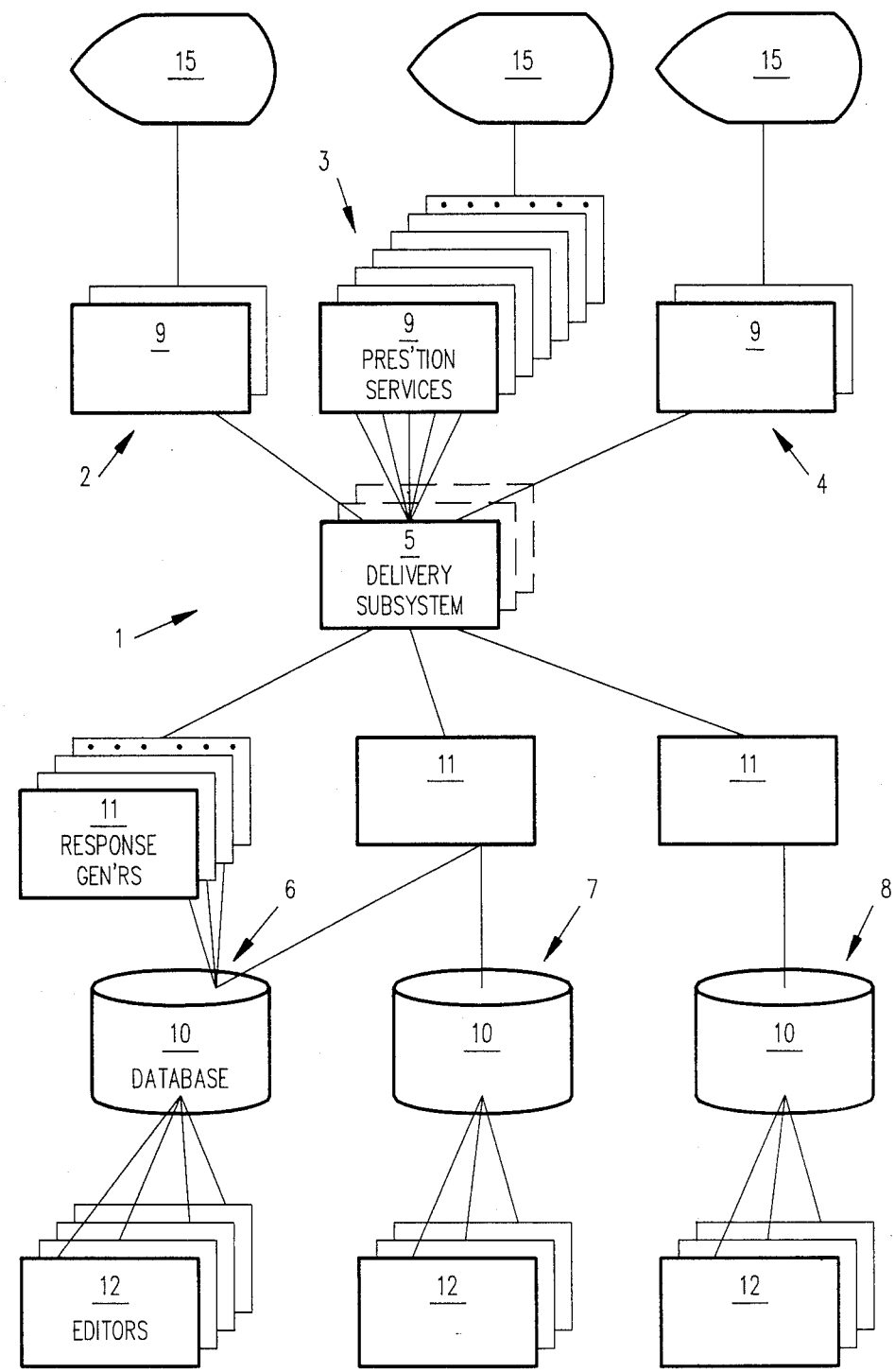
FIG. 1 is an overview block diagram of a system employing the present invention.
Figure 2:
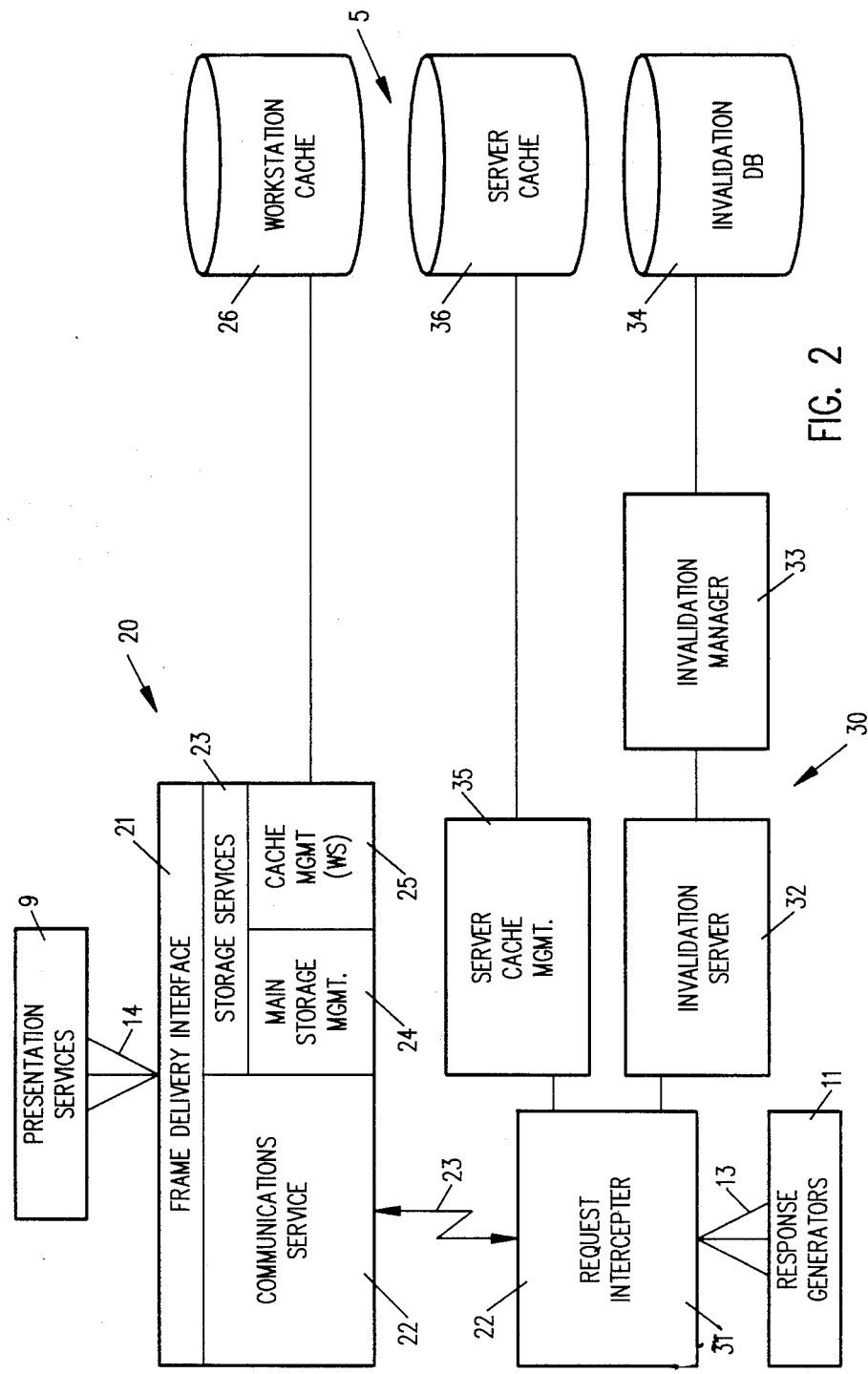
FIG. 2 is a block diagram of a delivery subsystem taught by the present invention.

With reference to FIG. 1, a distributed processing system within which the present invention can be used is described to provide a system overview. With reference to FIG. 2, the apparatus implementing the present invention is described. The balance of the figures set out the operation of a preferred embodiment of the present invention.

I. System Overview

FIG. 1 shows a generalized distributed processing system 1 made up of a network of nodes connected by communication links implementing the present invention. The nodes of the distributed processing system 1 shown in FIG. 1 include a plurality of workstations 2, 3, 4 in communication with a delivery subsystem 5 which may include multiple communication subsystems. The delivery subsystem 5 further communicates with one, or more, nodes operating as source locations 6, 7, 8. Of course, a given distributed system 1 could include any number of nodes, including workstations, delivery subsystems and source locations, and any machine in the system could serve as any combination of nodes.

The workstations 2, 3, 4 are typically computers which each include one or more presentation services 9 and display systems such as a video monitor 15 for presenting data to a user.

The source locations 6, 7, 8 typically include databases 10, such as relational databases, frame libraries, collections of data files, or other data storing systems that store source data objects. The databases 10 communicate with the delivery subsystem 5 through response generators 11 which access respective databases 10 to supply response messages to the delivery subsystem 5 in response to requests. A response message may include data objects or parts of data objects from one or more source locations 6, 7, 8 and/or one or more databases 10 within the source locations 6, 7, 8. Typically, the requests are generated at the workstations 2, 3, 4 or the replica location in response to user input or node control programming.

The source locations 6, 7, 8 also include editors 12 which maintain their respective databases 10. The editors update, delete, reorganize or perform other editing services on data objects stored in their respective databases 10. Thus, the data objects stored in the databases 10 are subject to being changed from time to time whereby more than one version of a data object may be created. Therefore, the replicas of data objects being viewed by a workstation 2, 3, 4 may be replicas at any given time of obsolete versions of source data objects.

The present invention provides a method implemented within the delivery subsystem 5 in a preferred embodiment, for calculating and propagating the impact of source data changes on replicas of data objects that exist in the system 1 and preserving consistent views of replicas of data objects at workstations 2, 3, 4.

II. Delivery Subsystem

FIG. 2 is a block diagram of a delivery subsystem 5 according to the preferred embodiment of the present invention. The delivery subsystem 5 shown in FIG. 2 includes at least one source location 30 communicating with the response generators 11 of one or more databases (see FIG. 1) and at least one replica location 20 communicating with the presentation services 9 at one or more workstations. Although not shown in FIG. 2, the invention supports large numbers of replica locations, such as replica location 20. Replica location 20 includes a frame delivery interface 21, a communications service 22 for the replica location, storage services 23, storage management 25, and a workstation cache 26.

Workstations may, for example, utilize frames of data for display on a video monitor. Thus the presentation services 9 of such a workstation include a means for generating a request for source data objects to fulfill the needs of a given frame for display on the video monitor. A frame delivery interface 21 provides data objects in the form required by the presentation services 9 at a given workstation. Also, the frame delivery interface 21 provides request signals from the presentation services 9 to the communication service 22 for transmission to a source location 30 across at least one communication link 23. The communication service 22 likewise receives responses including replicas of data objects from the source locations 30 for supply through the frame delivery interface 21 to the presentation services 9. Replicas of data objects received by the communications service 22 at the replica location are stored through storage management 25 in a workstation cache 26 using the request signal as a search key.

In the preferred embodiment the main storage management 24 is provided as part of a storage hierarchy at the replica location 20 for further performance enhancements.

The workstation cache 26 in the preferred embodiment is organized as a table having a request column, "MSG_ID", and a response column, "MSG", where the requesting key "MSG_ID" is generated by the presentation services 9 requesting data, and the response "MSG" is supplied by the response generator 11. In this manner the workstation cache 26 stores commonly used responses "MSG" for quick access by the presentation services 9 of the workstations in communication with the replica location 20. The workstation cache 26 can be managed using well known cache management schemes such as least-recently-used replacement algorithms and the like. Of course the management of the workstation cache 26 can be optimized to meet the needs of a particular user.

As indicated in FIG. 2, a communication service 22 provides a means for communicating across communication link 23 requests, responses and other information between at least one replica location 20 portion and at least one source location 30 portion of the delivery sybsystem 5. Associated with the source location 30, there is provided a request interceptor 31, an invalidation server 32, an invalidation manager 33, an invalidation database 34, server cache management 35 and a server cache 36.

The request interceptor 31 intercepts requests supplied by replica locations 20 and supplies the requests to the appropriate means for the generation of a response. When the request from the replica location 20 is one in which involves the managing of obsolete replicas of data objects that may be stored in workstation caches 26 in the system, then the request interceptor 31 supplies that request to the invalidation server 32. Otherwise the request is forwarded to some other response generator. The invalidation server 32 is a means in communication with the invalidation manager for processing the requests from replica locations 20 to determine obsolencence of replicas of data objects stored in the workstation caches 26. The invalidation server 32 retrieves messages from the invalidation manager 33 that identify obsolete replicas of data objects that may be stored in workstation caches 26 and communicates those messages to the replica locations 20 in the form of an atomic demand/response transaction.

The invalidation manager 33 maintains the invalidation database 34 storing obsolescence data including a list of identifiers of replicas that include obsolete data objects. The invalidation manager 33 hides and uses the invalidation database 34 to manage obsolescence for a set of workstation caches 26 in replica locations 20.

The invalidation database 34 stores data tables which are set out in Table 1 entitled "Database Description". The database description provided in Table 1 is organized by listing the title of the data table on the left margin followed by a list of the column headings of the data table and a description of the data contained in those columns.

TABLE 1
INVALIDATION DATABASE

Table USERIDS

| | |
|---|---|
| USER_ID | Identifier of a replica location (RL) using invalidation services. |

Table BADMESSAGES

| | |
|---|---|
| MSG_ID | Identifies a message sent to some RL |
| USER_ID | ID of a RL yet to be informed that the identified message is no longer valid. |
| DATETIME | Version number for grouping invalidation orders into sets which must be applied as units if the RL is to have consistent contents. Timestamps are used, but other formats are possible. |

Table CHANGE — work table only

| | |
|---|---|
| DB_ID | Identifies a table and a record set which is changed in the source DB. |
| DATETIME | Version number |

Table CHANGEDMSG — work table only

| | |
|---|---|
| ID | Identifies a message MSG (response) which is known to be changed. |
| DATETIME | Version number |

Table DEPENDMSG

| | |
|---|---|
| MSG_ID | Identifies a MSG sent to some RL. |
| DB_ID | Identifies a table and record set from the source DB that have been used to construct the message MSG. |

In a preferred embodiment, the source location 30 in the delivery sybsystem 5 includes a server cache 36 which is serviced by the server cache management 35 in communication with the request interceptor 31. The server cache 36 is used to store replicas of data objects which have been sent via the communications service 22 to the replica locations 20 in the system. The cache management 35 for the server cache 36 can be implemented using a variety of cache management schemes such as a least-recently-used algorithm. The server cache 36 is organized as shown in Table 2.

TABLE 2
SERVER CACHE DATA

Table MSGCACHE

| | |
|---|---|
| MSG | A replica of a message MSG (response) sent to a RL |
| MSG_ID | Message identifier or key |
| DATETIME | Version number of MSG |
| MSG_LENGTH | Identifies the length of the response message MSG stored. |

In operation, a replica location 20 supplies a request to the communications service 22 to ascertain obsolescence of replicas of data objects that may be stored in the workstation cache 26 of the requesting replica location. The request to determine obsolescence may be generated either by the replica location 20 or by individual workstations associated with the replica location 20 depending on the particular implementation. The request interceptor 31 communicates the request to ascertain obsolescence of data objects to the invalidation server 32. The invalidation server 32 extracts through the invalidation manager 33 identifiers of a set of obsolete versions of data objects related to the requesting replica location. Then the invalidation server 32 communicates the extracted identifiers, if any, across the communication link 23 in the form of an atomic demand/response transaction to the requesting replica location 20. Upon completion of the atomic demand/response transaction, the invalidation manager 33 updates the obsolescence data tables (BADMESSAGES, DEPENDMSG) to remove the communicated identifiers from set of identifiers related to the requesting replica location in the invalidation database 34. At the replica location 20, the replicas corresponding to the communicated identifiers are rendered inaccessible by the cache management 25 and cache space in the workstation cache 26 in which the inaccessible replicas were stored becomes available for subsequent storage use.

By providing obsolescence data only in response to requests from replica locations 20, the invention allows separate replica locations 20 to view mutually inconsistent versions of data. However, each individual replica location 20 makes accessible only data consistent with the versions accessible at that replica location 20 stored in its local cache 26. This consistency requirement unique to the present invention imposes the need to prevent the source location 30 from sending versions of data objects to a requesting replica location 20 that are inconsistent with the versions accessible at the requesting replica location 20.

When a replica location 20 supplies a request MSG_ID for a source data object MSG to the communication service 22, the request interceptor 31 communicates the request to a response generator 11 or server cache 36. The source database and server cache may contain data objects that are inconsistent with versions of data objects accessible at the requesting replica location 20. In response to a request for a data object, the request interceptor 31 supplies the server cache 36 or response generator 11 version number information or timestamps obtained from the invalidation server 32 that identifies the versions currently accessible at the requesting replica location so that a response is supplied that is consistent with the supplied version number. In this manner, the replica location 20 is prevented from presenting inconsistent views of data objects to the users at the workstations.

When part of a source data base is changed, some previously distributed replicas become obsolete. The impacted replicas are identified by the invalidation manager based on information received from the source editors about the source changes. The information about the source changes is provided by generating hash codes that identify subsets of the affected database within which the source change occurred.

Each response generator provides "where used" informatin in the form of hash codes which identify, not necessarily uniquely, the source data objects used in the generation of a given response. The request interceptor and invalidation manager combine this information with response keys to build the DEPENDMSG table from which the set of responses impacted by a source data change can be calculated. Whenever a source data editor makes changes, it provides hash codes identifying the records changed from which an entry in the CHANGE table or CHANGEDMSG table is made.

Figure 14:
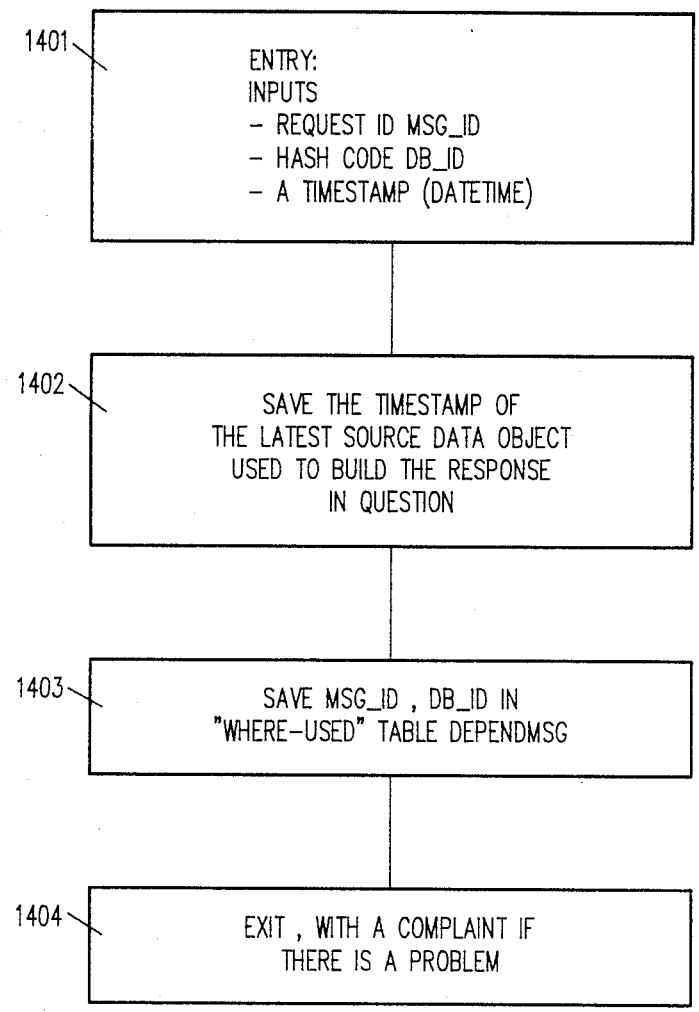
Figure 15:
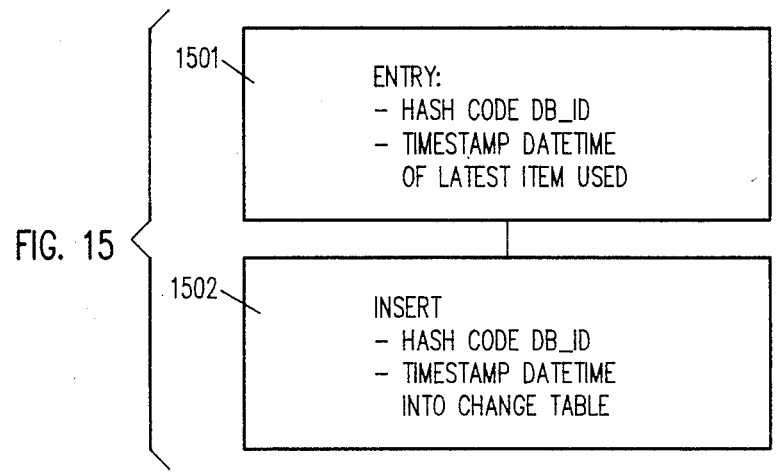
Figure 16:
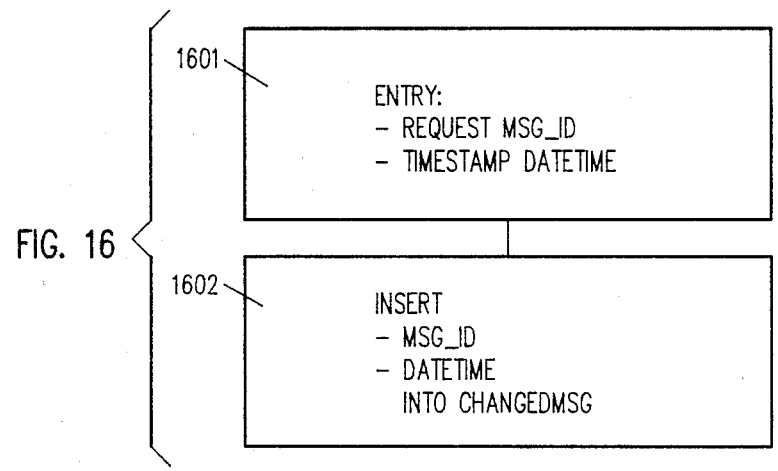

A detailed description of the generation of the CHANGE and CHANGEDMSG tables is described with regard to FIGS. 15 and 16. The generation of the DEPENDMSG table is described with reference to FIG. 14. Last, the generation of the list of candidate replica locations affected by a source data change to be stored in the BADMESSAGES table is described with reference to FIG. 18.

Source data change programs must use the "where used" hash code scheme that was defined by response generators, i.e. the author of a change program must know the queries used and the related hash code scheme. The latter knowledge is akin to the knowledge the author needs about table schema and schematics, and can be considered to be an extension of each table schema which has to be communicated as part of an application description.

The preferred embodiment uses for the hash code the variable part of the predicate (or some function of this variable part) of the request used to find source data in the response generation program. For example, suppose the response generator in question accesses source data using the SQL language. For a query such as the following:

```
SELECT some_fields
    FROM SOURCE TABLE
    WHERE field_1 = :value_1
      AND field_2 = :value_2
      AND ···;
``` the hash code can be generated using value_1, prefixed by a code to identify SOURCE_TABLE. If each change program communicates the content of field_1 for each changed source element, then the invalidation manager will find all potentially impacted responses. A user might choose to work with field_2, or with a combination of both fields. In this manner, the hash code identifies portions of the source database that were intended to be used in the generation of a replica, even those portions that may be added to the source database after the replica is returned to a replica location. For instance, suppose field-1 identifies articles in inventory and value-1 is shoes, field-2 identifies a characteristic of the articles such as color and value-2 is brown, and subsequent fields in the table further specify other characteristics of the articles. If a replica is supplied in response to a request for all brown shoes, and later an addition to the database of a new type of brown shoes is made, then any of the three alternative hash code schemes suggested above will identify the portion of the database to which the new type of brown shoe was stored. The value from the chosen hash code scheme is communicated by the edit program to the invalidation manager in conjunction with adding the new type of brown shoes. The communicated hash code is added to other similar entries in the CHANGE table. When the BADMESSAGES table is updated, the replica will be identified as obsolete by a union of the CHANGE table and the DEPENDMSG table.

It is always possible to choose a "where used" hash code so that no affected response is overlooked when a source record is changed. In the worst case, the code selects the entire source data collection. The preferred embodiment, it selects only the data elements actually changed, or a set that is not much larger.

Alternative sources of this "where used" information are possible. For example, a database management system may be modified to provide the invalidation manager with object descriptors, or algorithmic relationships between requests and source data identifiers for hash codes. The invalidation manager does depend on "where used" information from some source, but is not restricted as to the nature of the source.

A table may have more than one hash code defined; this is needed if different queries use predicates on non-intersecting sets of fields. Multiple hash codes tend to make the impact calculation consider a larger set of records but do not affect the value of the result.

III. Functional Components of the Delivery Subsystem

A detailed discussion of the operation of components of the delivery subsystem 5 follows.

III. A. Request Interceptor

Figure 3:
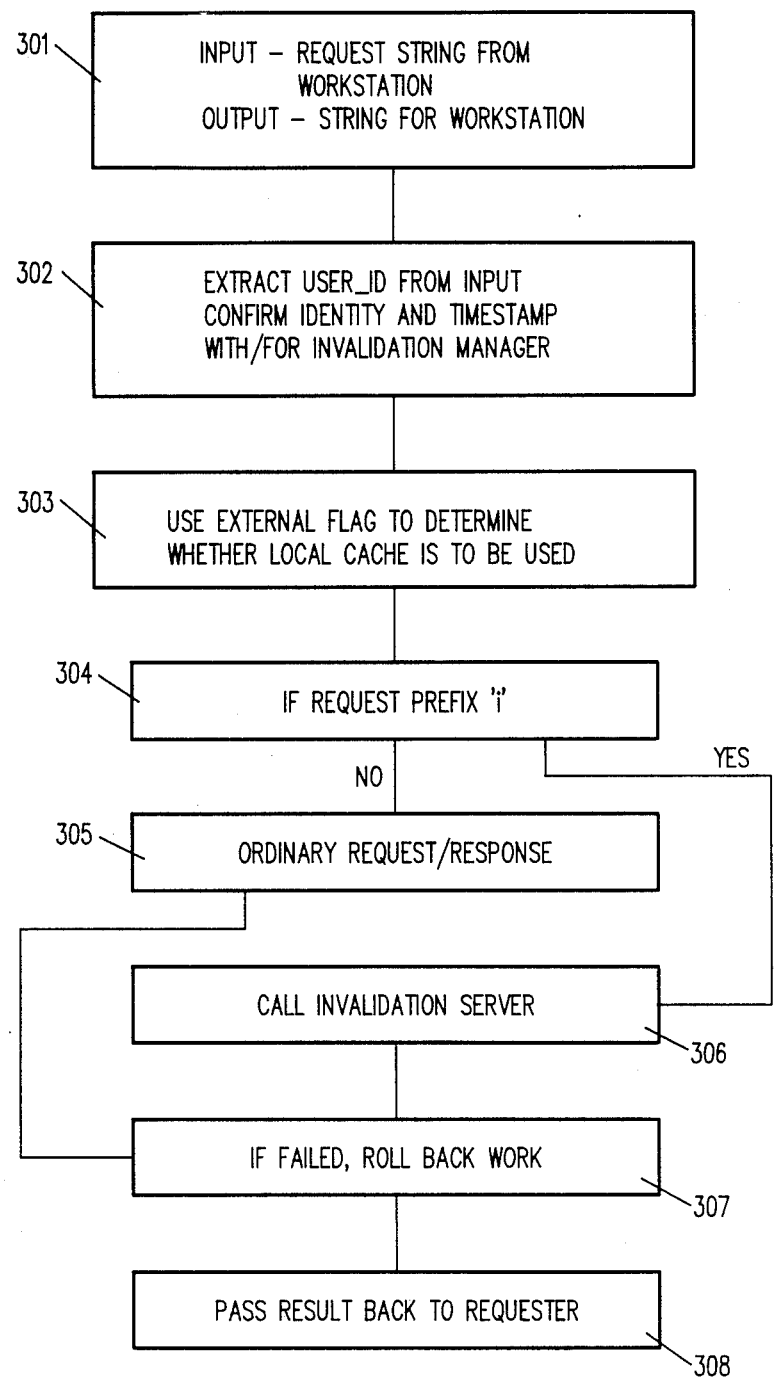
FIGS. 3 and 4 are flowcharts illustrating the operation of the request interceptor in the delivery subsystem.

A flow chart of the operation of the request interceptor 31 is shown in FIG. 3. The request interceptor 31 receives as input from the communications service 22 a request or string of requests from the replica location 20 including a replica location identifier USER_ID for the requesting station and provides as output to the communication service a response consisting of a string of data objects MSG or other messages for the replica location 20 (Block 301).

In operation, the request interceptor extracts the replica location identifier USER_ID from the input string and confirms the identity and timestamp indicating currency for the replica location from the PL/1 global variable MSGSTMP (Block 302). Next, if the server cache 36 is to be used, an external flag will be set, so the request interceptor 31 checks for the flag (Block 303). In the preferred implementation the server cache 36 is always used. Next, the prefix of the request from the workstation is reviewed to determine whether it is in fact a request for invalidation server (Block 304). If it is not a request for the invalidation server, then the request is processed as a request-for-data subroutine which is described with reference to FIG. 4 (Block 305). If the request is determined in Block 304 to be a call for the invalidation server, then the invalidation server subroutine (See FIGS. 7 through 10) is called (Block 306). If the invalidation server subroutine called in Block 306 fails, then the work is rolled back so that the request can be called again by the replica locatin 20 (Block 307). If the call to the invalidation server subroutine in Block 306 succeeds, then the request interceptor 31 passes the response back to the requesting replica location (Block 308).

The request-for-data subroutine in the request interceptor which is called in Block 305, is described with reference to FIG. 4. The request-for-data subroutine retrieves replicas of data objects from the source databases and returns them to a replica location 20. First, the invalidation manager is queried to determine a currency timestamp indicating the view of data being processed at the requesting replica location (Block 401). Next, an attempt is made to retrieve the requested data objects from the server cache 36 (Block 402). If the access to the server cache fails or suffers an error, then the message is rolled back to allow the request to be reprocessed (Block 403). To indicate that a request for a data object is being processed, a status counter is set to zero (Block 404). The status counter is used as described below by the invalidation server 32. The subroutine then determines whether the access to the server cache has been successful (Block 405). If the access to the server cache was successful, then the response is passed back to the request interceptor (Block 409) which in turn returns the response to the requesting replica location (see Block 308 of FIG. 3).

If the access to the server cache was not successful in retrieving the requested response, then the subroutine generates a call to the response generators associated with the given delivery subsystem (Block 406) and the response generators return the response fulfilling the request along with a set of hash codes DB_ID identifying particular portions of the source databases which were used to fill the request. The hash codes DB_ID received from the response generators are stored in the DEPENDMSG table in the invalidation manager with each hash code DB_ID paired with the request MSG_ID to which it is responsive, unless the pair is already in the table (Block 407) using an invalidation manager interface described in connection with FIG. 15 below. Next, a replica of the response is stored into the server cache, if desired, along with a version number indicating the currency of the response (Block 408).

III. B. Server Cache Manager

Figure 5:
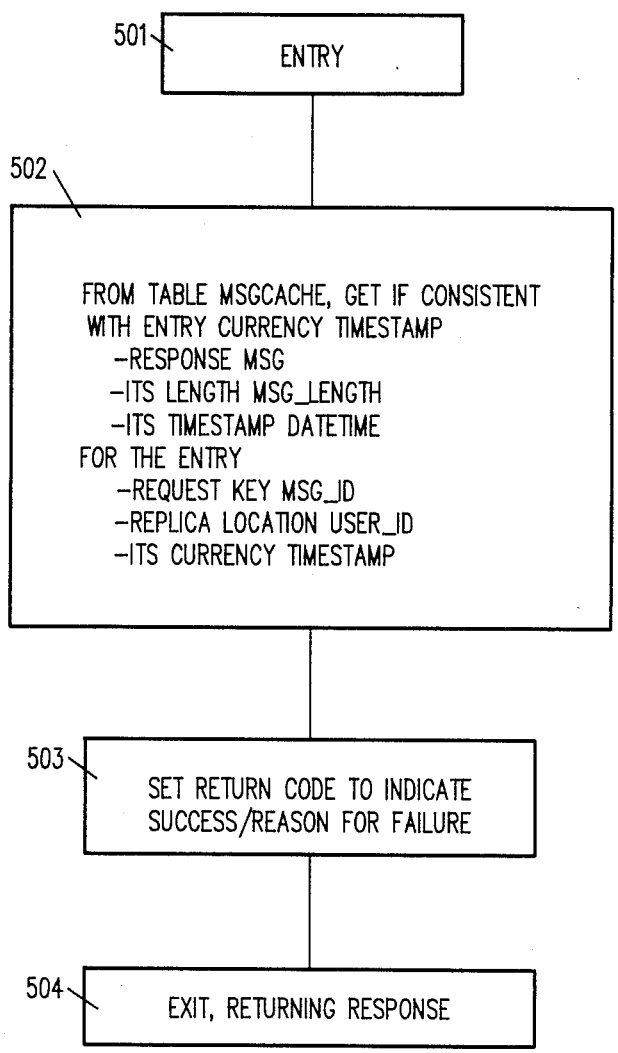
FIGS. 5 and 6 are flowcharts illustrating the operation of the server cache manager in the delivery subsystem.
Figure 6:
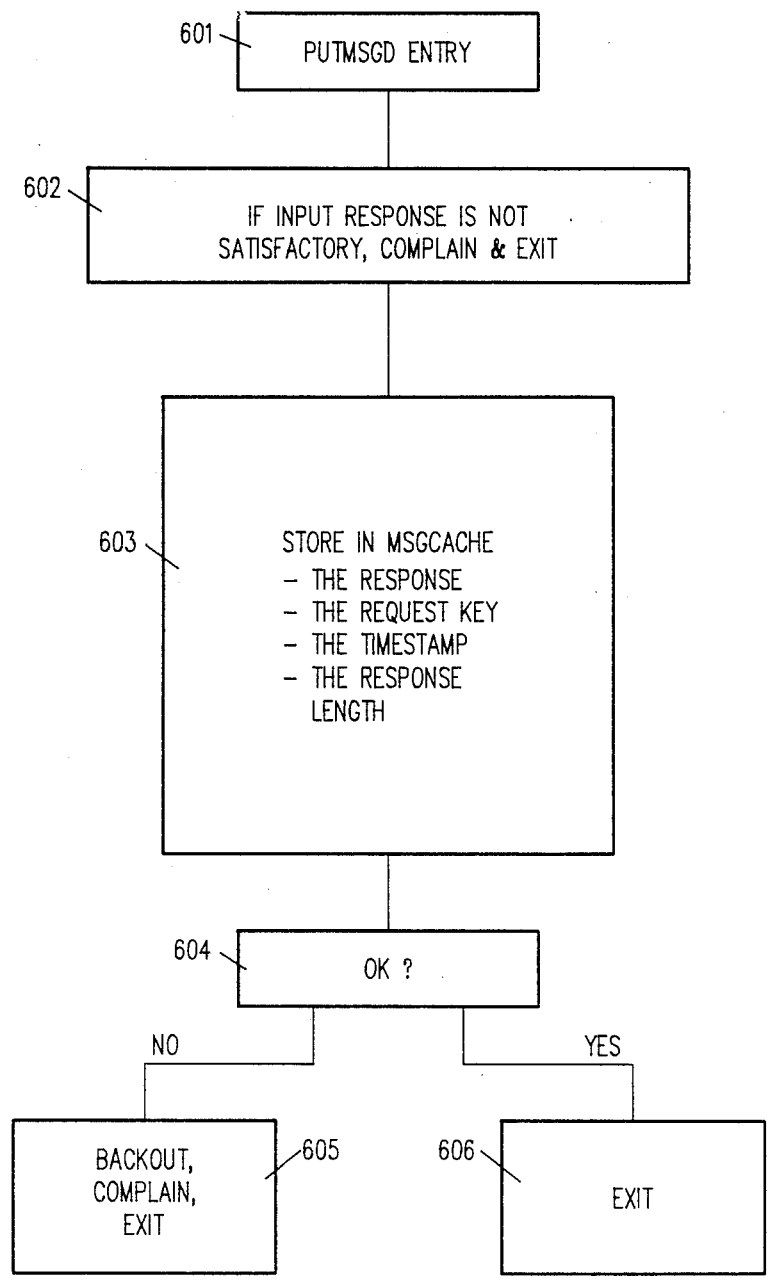

The server cache manager 35 operates according to subroutines shown in FIGS. 5 and 6. The subroutine shown in FIG. 5 operates in response to a call (Block 501) to retrieve a response MSG from the MSGCACHE table in the server cache as described in Block 502. In Block 502, the subroutine retrieves the requested response MSG and data indicating the length of the response MSG_LENGTH and the version number DATETIME for the response. The entry to the subroutine includes the request MSG_ID, the replica location identifier USER_ID for the location generating the request, and the latest version number DATETIME allowable for the requesting replica location to prevent inconsistencies in data viewed at that replica location. The latest version number DATETIME is indicated by the timestamp of the next set of incomplete invalidations for the requesting replica location as determined below with reference to FIG. 13. In Block 503, a return code is set to indicate success in obtaining a response or failure and the reason for the failure (Block 503). Last, the routine is exited and the response is returned to the request interceptor (Block 504).

Figure 4:
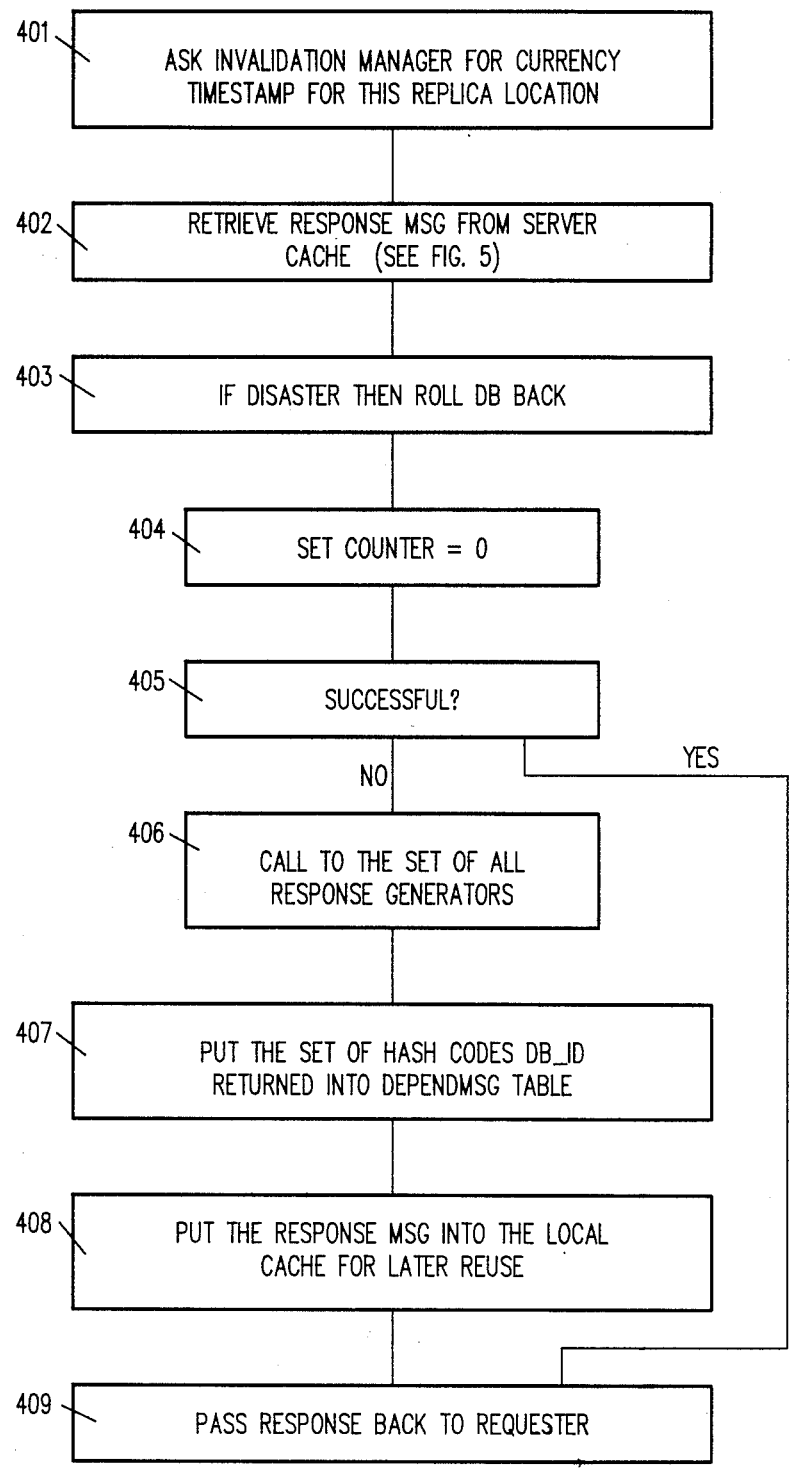

In response to acall to store into the server cache, such as Block 408 of FIG. 4, (Block 601), the subroutine of FIG. 6 reviews the response MSG and other inputs to be stored to the MSGCACHE table in the server cache to determine whether they are satisfactory (Block 602). If the response MSG is not satisfactory, then the subroutine is exited. Otherwise, an entry is made to the MSGCACHE table including the response MSG, the request key MSG_ID, the timestamp DATETIME and the response length MSG_LENGTH (Block 603). Last, the subroutine determines whether the subroutine has been successful and no errors have occurred (Block 604). If there were errors or the subroutine was otherwise unsuccessful, then the changes are all backed out and a complaint message is issued (Block 605). Otherwise the system exits (Block 606).

III. C. Invalidation Server

FIGS. 7 through 10 illustrate the method of operation of the invalidation server and invalidation manager according to the present invention. The method operates in four modes. The modes are determined by a message flag that is set to "done" or "not done" and a counter that is set to "1" or "0" (See FIG. 4, Block 403).

Figure 7:
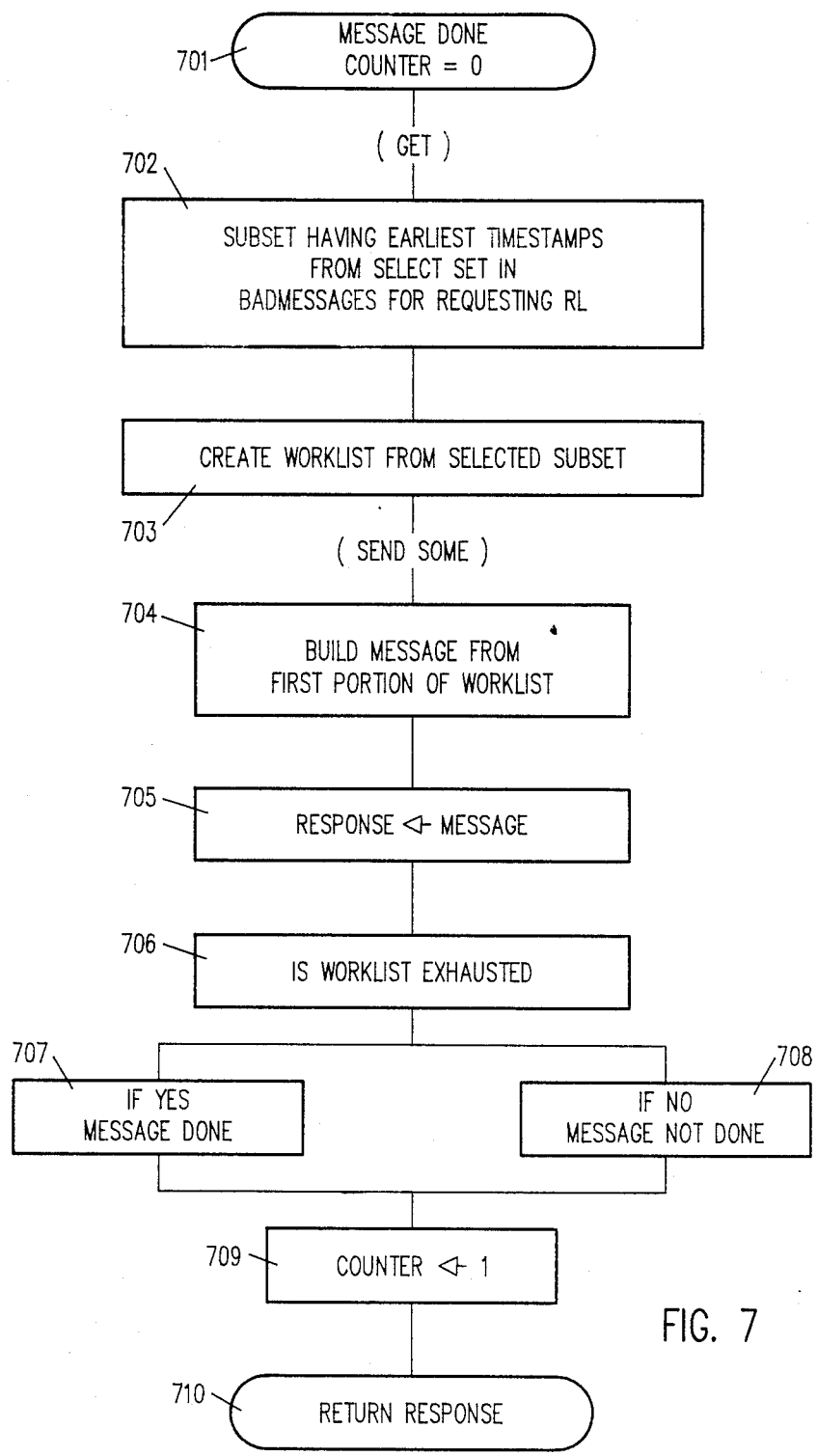
FIGS. 7 through 10 are flowcharts illustrating the operation of the invalidation server in the delivery subsystem according to the present invention.

In the first mode, as illustrated in FIG. 7, the message flag indicates "done" and the counter is equal to zero (Block 701). In this mode responsive to a request to determine obsolescence of replicas, the invalidation server excutes a GET subroutine. The GET subroutine first selects a subset having earliest timestamps DATETIME from the set in the BADMESSAGES table for the requesting replica location USER_ID provided that such a timestamp indicates a time prior to the present instant (Block 702). From the selected subset, the invalidation server creates a work list (Block 703) having a start location and a pointer to the next portion of the worklist to be processed.

Upon creation of the work list (Block 703), the server executes the subroutine SEND SOME. Subroutine SEND SOME builds a message from a first portion of the worklist (Block 704). Next, the response to be sent is set equal to the message built from that first portion (Block 705). The server then determines whether the work list is exhausted by use of the first portion (Block 706). If the work list is exhausted, then the message flag is set to "done" (Block 707). If the worklist is not exhausted then the message flag is set to "not done" (block 708). Next, the counter is set equal to 1 (block 709), indicating that a worklist is in the process of being sent to the requesting replica location so that in a subsequent step, the invalidation server can check that the next portion of the worklist may be transmitted. Finally, the response containing the invalidation message is returned (block 710).

Figure 8:
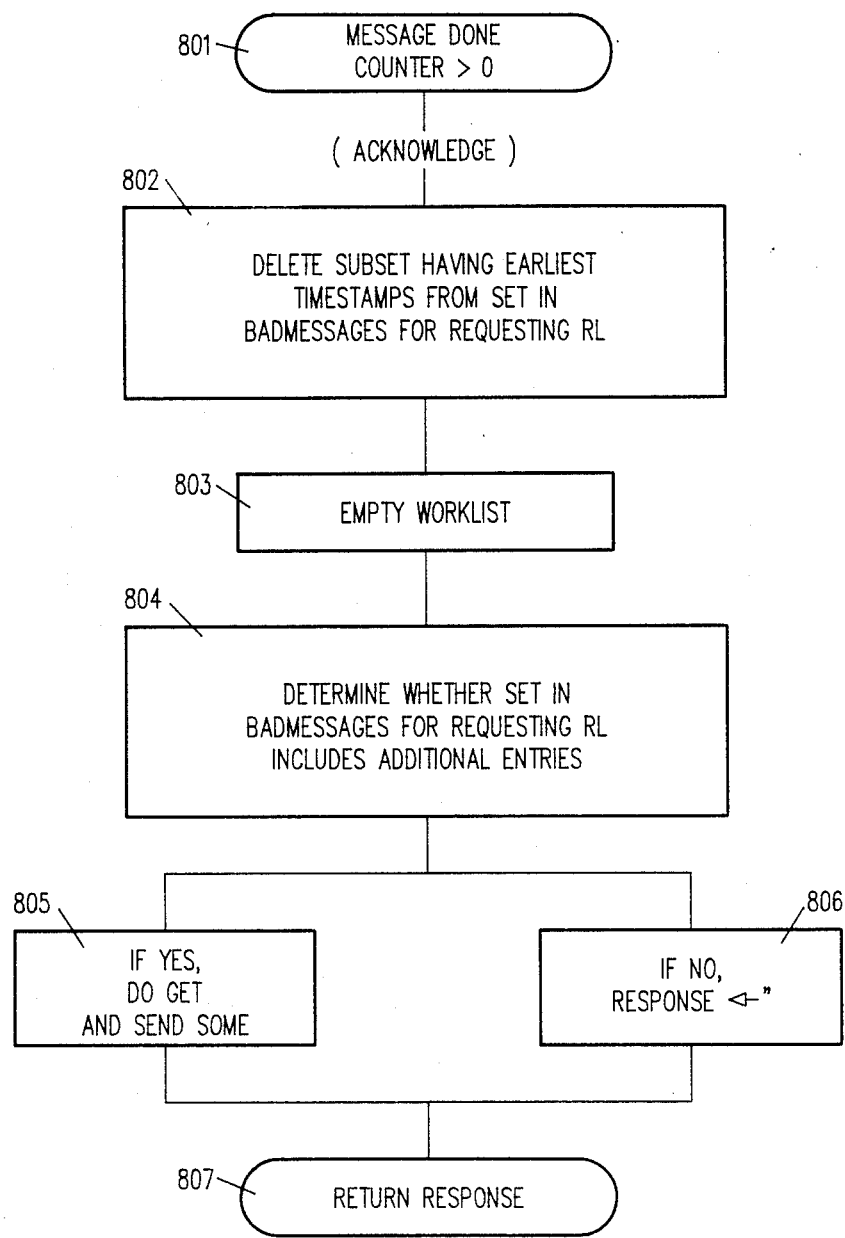

In the normal sequence of events as indicated by the process described with reference to FIG. 7, the next request from the requesting replica location would be a repeated request to determine obsolescence of replicas of data objects in its workstation cache. In this case, the counter had been set equal to 1 and the message flag will either be set "done" or "not done", as indicated by blocks 701, 707 and 708, respectively, of the flow chart in FIG. 7. FIG. 8 illustrates the mode in which the message flag is set to "done".

FIG. 8 operates in the mode when the message flag indicates that the previous message is done and the counter is greater than zero block 801). In this mode, an ACKNOWLEDGE subroutine is executed. The first step in this subroutine is to delete the subset having the earliest timestamps from the set in BADMESSAGES for the requesting replica location (block 802). At this point the atomic demand/response transaction is complete, because the requesting replica location acknowledges receipt of the earlier response generated by the process discussed with respect to FIG. 7 by requesting additional information concerning obsolescence of data in its cache and the message flag indicates that there is no more information in the worklist to be sent to that replica location to maintain consistency of versions in its cache. Therefore, the requesting workstation by requesting additional information concerning obsolescence acknowledges deletion of the obsolete versions of data objects stored in its cache and the invalidation manager is free to delete that information from the BADMESSAGES table.

In the next step in the process shown in FIG. 8, the invalidation server empties the worklist (block 803). Then, the server determines whether the set in BADMESSAGES for the requesting replica location includes additional entries (block 804). If there are such additional entries in the set for the requesting replica location whose timestamp is prior to the present instant, the additional entries will have timestamps more recent than the timestamps of the subset just deleted in block 802. If there are additional entries in the set for the requesting replica location, then the server does the GET and SEND SOME subroutines in a manner identical to that described with reference to FIG. 7 (block 805). If there are no additional entries in the BADMESSAGES table for the requesting replica locations, then the server sets the response equal to the empty set indicated by """ (block 806). In either case, the generated response is then returned to the requesting replica location (block 807).

Figure 9:
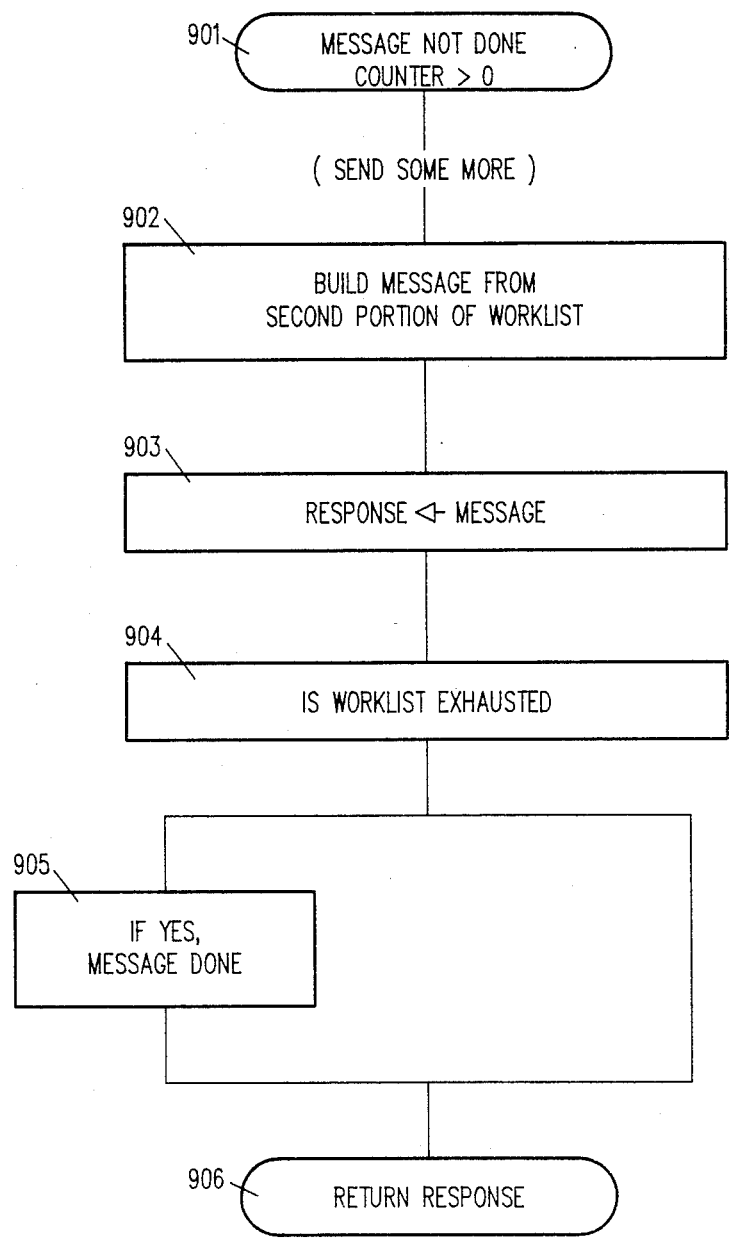

The second state flowing from the process described in FIG. 7 is set out in FIG. 9. This state corresponds to the message flag being set to "not done", and the counter being greater than zero (block 901). In this third mode, the invalidation server executes the SEND SOME MORE subroutine. The first step SEND SOME MORE subroutine is to build a message from a next portion of the worklist (block 902). The worklist from which this message is generated was created at block 703 of FIG. 7. Then the response is set equal to the message built in block 902 (block 903). Next, the invalidation server determines whether the worklist is exhausted (block 904). If the worklist is exhausted, then the message flag is set to "done" (block 905). The counter is not changed in this sequence. Next, the response is returned to the requesting location (block 906).

Figure 10:
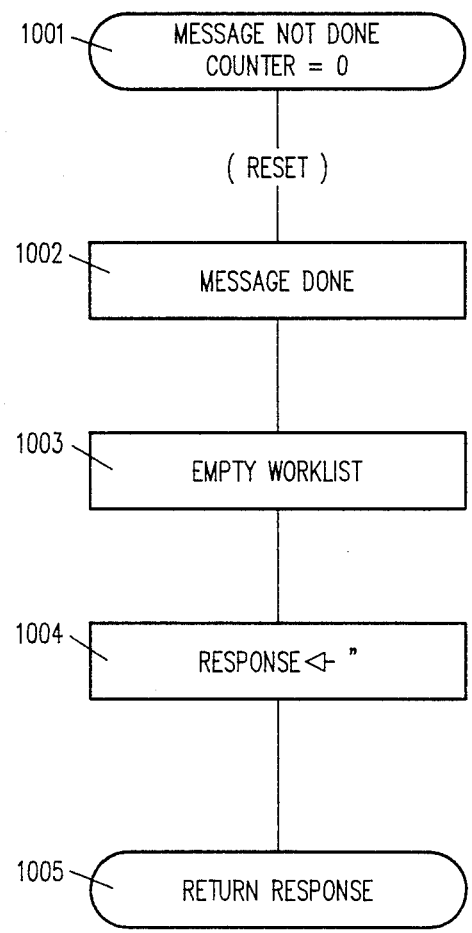

FIG. 10 illustrates the case in which the message flag is set to "not done" and the counter is equal to zero when a request to determine obsolescence of data stored in the cache of a given replica location is received by the invalidation server. This state can occur between the execution of the process described with reference to FIG. 7 and those described with reference to FIGS. 8 and 9 in the event that the request interceptor receives a request other than one to determine obsolescence of data in the cache of a replica location. In this event the request interceptor has set the counter equal to zero (See FIG. 4, Block 403) to prevent the execution of the processes described in FIGS. 8 and 9.

Accordingly, the process shown in FIG. 10 is indicated when the message is not done and the counter is equal to zero (block 1001). In this state, the invalidation server executes a RESET subroutine.

The reset subroutine described in FIG. 10 begins by setting the message flag to "done" (block 1002). Then the worklist generated by block 303 of the process in FIG. 7 is reset (block 1003) by setting an address pointer for the memory location assigned to the worklist function back to the start position. The response is set to the empty set indicated by "" (block 1004). Then the empty set response 4 is returned to the requesting replica location (block 1005).

Thus in the case illustrated in FIG. 10, when the transaction for sending a message for the deletion of obsolete replicas of data objects stored in workstation caches is interrupted, then the BADMESSAGES table is not affected by the interruption and any existing worklist is reset. The status flags including the message flag and the counter are set to "done" and zero respectively so that the next call to the invalidation server to determine obsolescence of data objects at the requesting replica location will be processed according to the steps shown in FIG. 7. This assures that the entire worklist for the earliest timestamps of data objects that may be obsolete at a requesting replica location are processed in an atomic demand/response transaction.

III. D. Invalidation Manager

The invalidation manager 33 can be implemented as a virtual machine for managing the invalidation database through the invalidation server 32 and the source location database editors. The subroutines illustrating the operation of the invalidation manager as it communicates with the invalidation server and the source locations are described below in FIGS. 11 through 18.

Figure 11:
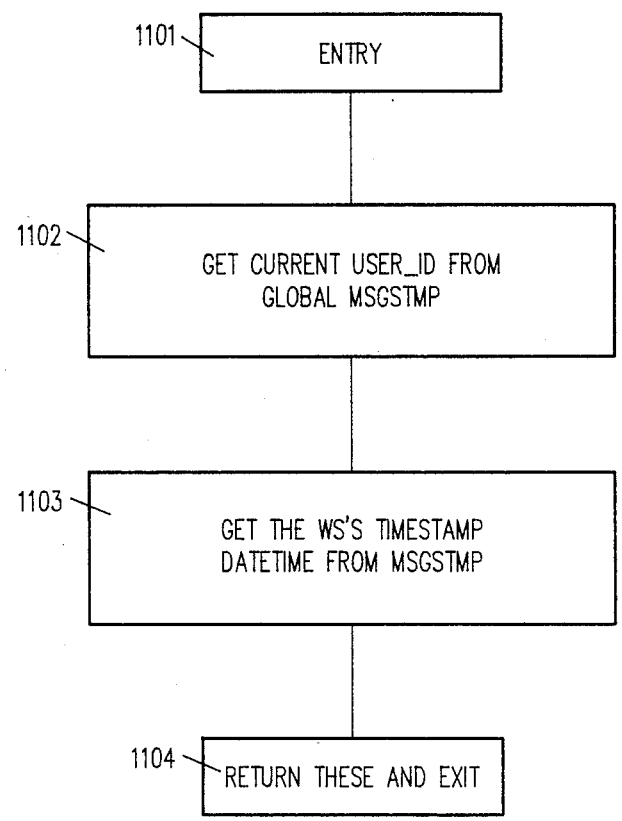
FIGS. 11, 12, 13, 14, 15, 16, 17, 18A, 18B and 18C are flowcharts illustrating the operation of the invalidation manager in the delivery subsystem according to the present invention.

FIG. 11 illustrates the flow chart of a subroutine that when called retrieves from the PL/1 global variable MSGSTMP the replica location identifier USER_ID for the requesting replica location and the timestamp DATETIME indicating the currency of that replica location (Blocks 1102 and 1103). Then both the replica location USER_ID and the timestamp DATETIME are returned to the requestor (Block 1104).

Figure 12:
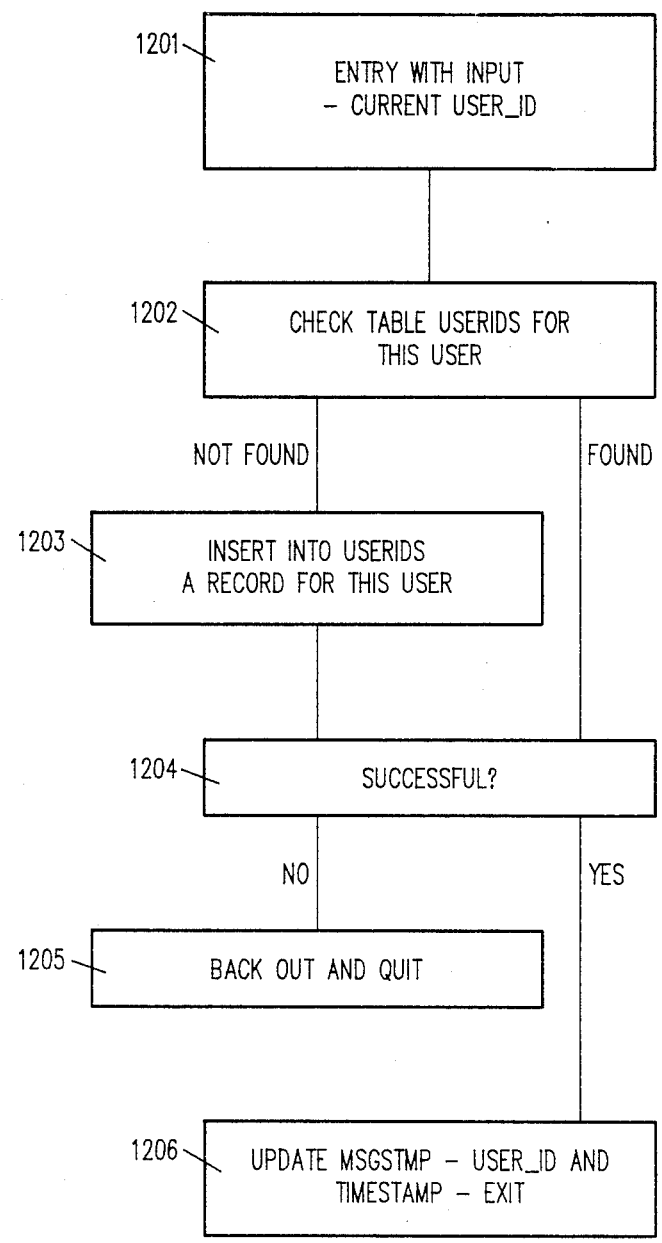

An entry to the subroutine shown in FIG. 12 includes a current replica location identifier USER_ID (Block 1201). The subroutine checks the table USERIDS for the entered replica location identifier USER_ID (Block 1202). If the table does not include an entry for the entered replica location, then a record is inserted (Block 1203). If an entry was found in the step described in Block 1202, then no change is made to the table. Next the subroutine determines whether or not the check of the USERID table was successful (Block 1204). If it was not successful, then the subroutine is backed out of so that the access can be requested again (Block 1205). If the check of the table was successful, then the global variable MSGSTMP storing the replica location identifier USER_ID and the timestamp DATETIME is updated (Block 1206) using the subroutine described in FIG. 13.

Figure 13:
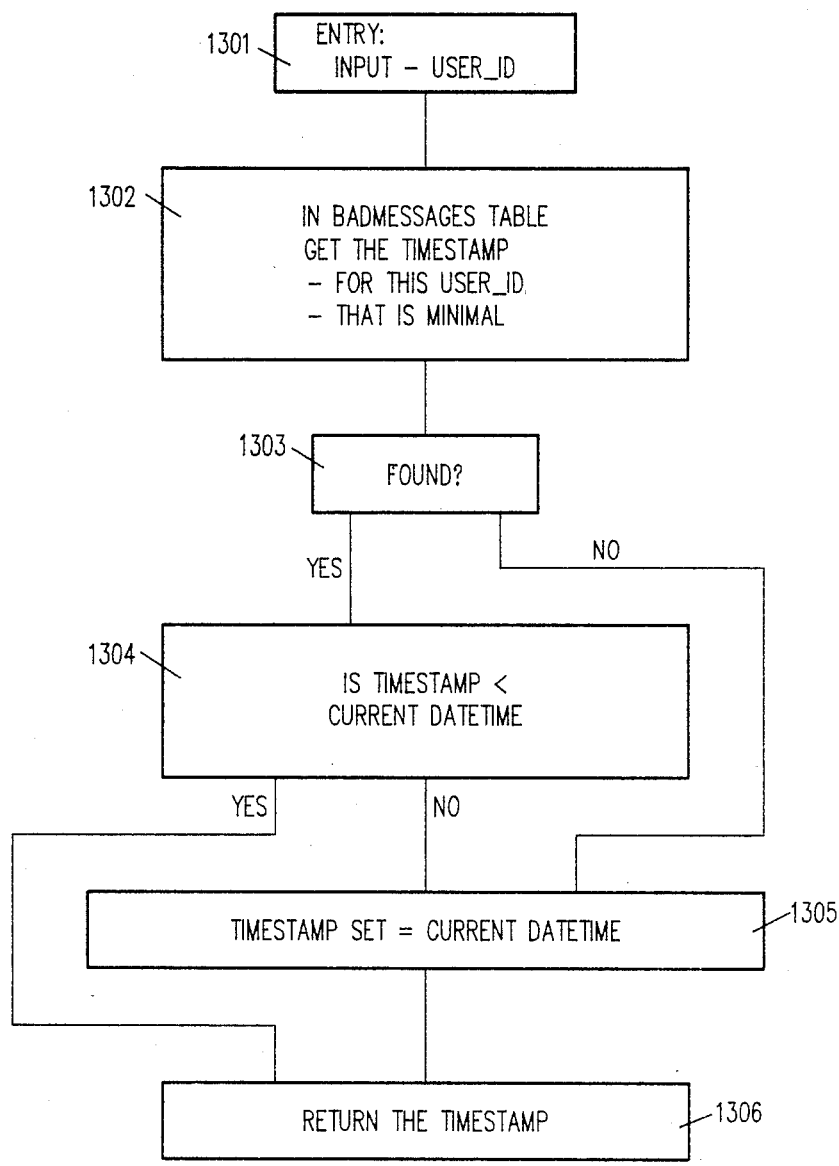

FIG. 13 shows the flowchart for a subroutine for updating a global variable in MSGSTMP for an identified replica location. The oldest timestamp, or currency version number, for an identified replica location for use in preventing the request interceptor from passing inconsistent views of data to the replica location is returned. An entry to the subroutine includes the replica location identifier USER_ID (Block 1301). Next, the BADMESSAGES table is searched to return the timestamp DATETIME of the oldest entry for this replica location (Block 1302). If an entry for the requesting replica location is found (Block 1303) then the routine determines whether the oldest timestamp DATETIME in the BADMESSAGES table for this replica location is older than the current DATETIME timestamp (Block 1304). If an entry is not found in the step described in Block 1303, then the timestamp to be returned for the replica location is set to the current timestamp (Block 1305). Likewise, if the timestamp for the oldest entry in the BADMESSAGES table for the requesting replica location is newer than the current timestamp (indicating a change to take effect in the future) for the replica location, then the timestamp for the replica location to be returned is set to the current timestamp. Otherwise, the timestamp retrieved from the BADMESSAGES table is returned (Block 1306).

FIG. 14 illustrates a subroutine which records data concerning a subject response MSG in the DEPENDMSG table in the invalidation database and determines the timestamp of the most recent data element used to form the response MSG. The inputs to the subroutine are the request MSG_ID and a set of hash codes DB_ID indicating the source data elements used to create the response MSG to the request MSG_ID (Block 1401), each accompanied by the timestamp of the latest database element of those used in constructing the response. The subroutine saves the timestamp from the latest database element used to build the response identified by the request MSG_ID as the records are scanned to fill the DEPENDMSG table (Block 1402). Next, the subroutine records in the DEPENDMSG table in the invalidation manager the request MSG_ID paired with each hash code DB_ID in the set of hash codes to record information indicating where a given source database element is used within the system (Block 1403). Last, the system exits after recording dependencies while detecting any problems that could have occurred during the attempt to record the dependencies and issuing a complaint if such problems were detected (Block 1404).

The manager also includes a subroutine, not shown in the figures, that returns the timestamp of the latest database element used to build a given response as saved in Block 1402 of FIG. 14 to be used in Block 408.

The subroutine shown in FIG. 15 operates to insert data into the CHANGE work table in the invalidation manager. The entry into this subroutine is the set of hash codes DB_ID supplied by a source editor identifying the portion of the source database including the source data elements changed in response to a given operation, and the timestamp of the latest source data item affected by the change (Block 1501). Next, each of the items liseted in Block 1501 is inserted into the CHANGE table (Block 1502).

The subroutine shown in FIG. 16 is used in place of the subroutine shown in FIG. 15 when the source database accessed is organized such that a request MSG_ID identifies the elements in the source database and can be used as a hash code. In this case, the entry to the subroutine includes the request MSG_ID identifying affected source data objects and a timestamp associated with the request (Block 1601). The subroutine inserts each of the items listed in Block 1601 into the CHANGEDMSG table (Block 1602).

Figure 17:
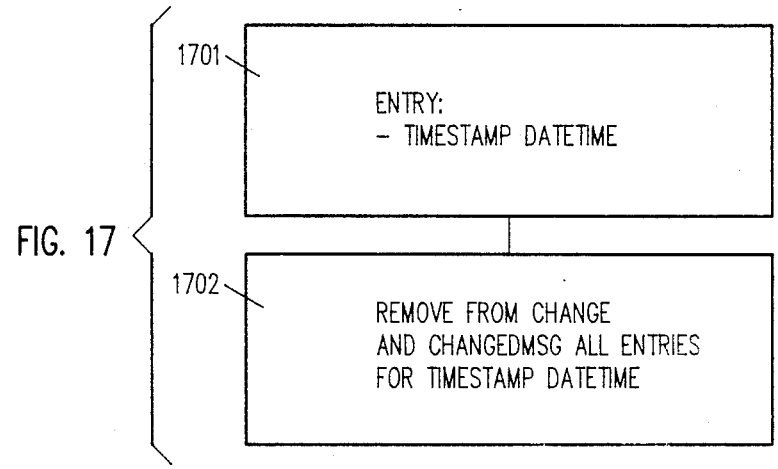

The subroutine shown in FIG. 17 serves to communicate that a set of changes have been processed by storage in the BADMESSAGES table. An entry into this subroutine is a timestamp (Block 1701). In response to the timestamp, all entries for that timestamp are removed from the CHANGE and CHANGEDMSG tables (Block 1702).

Figure 18A:
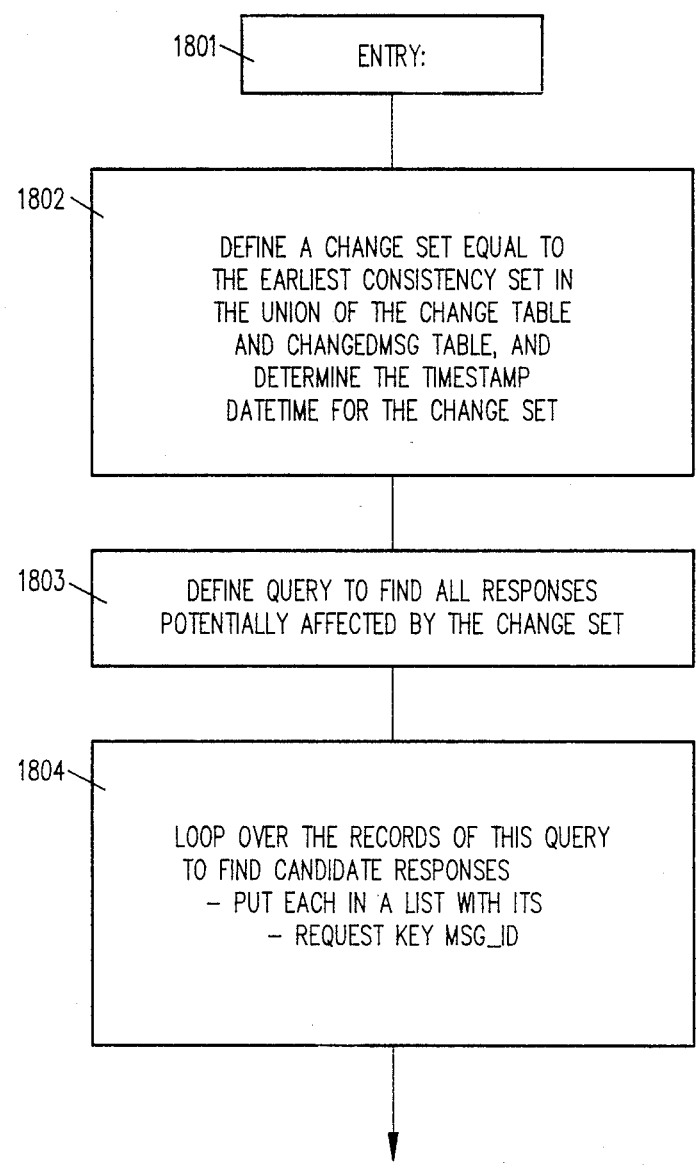
Figure 18B:
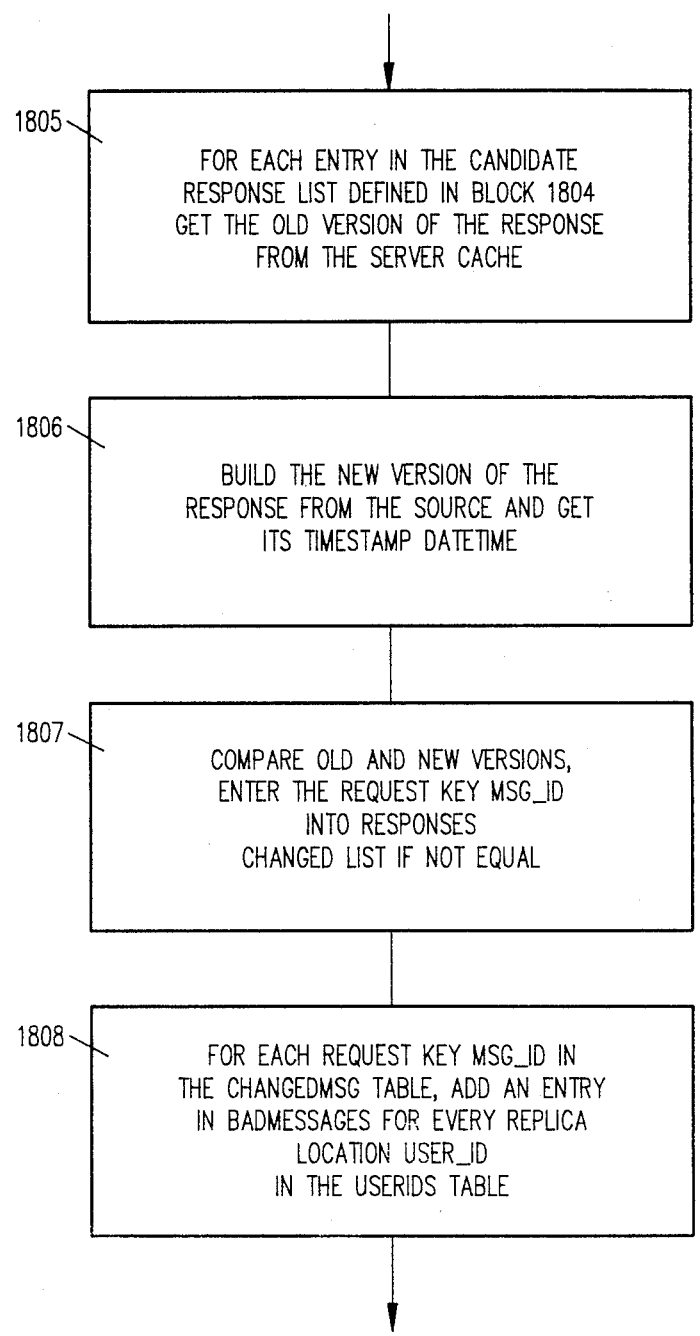
Figure 18C:
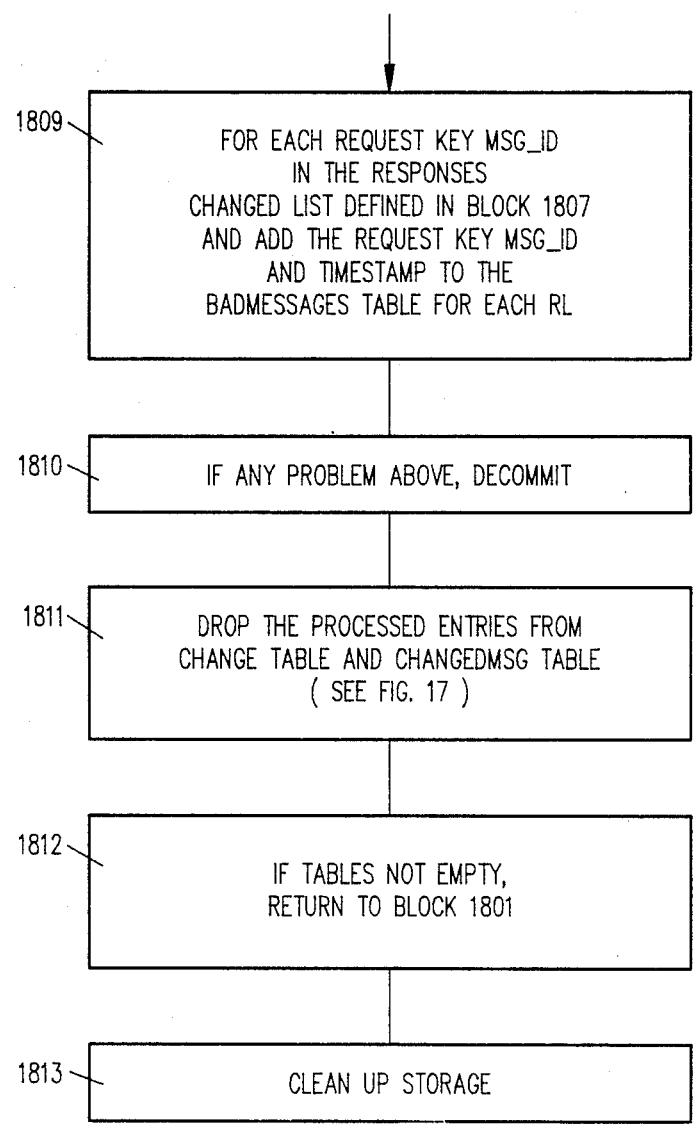

The subroutine described in FIG. 18 uses the CHANGE and CHANGEDMSG tables created by subroutines described in FIGS. 15 and 16 to build for each effective replica location a list of the identifiers of obsolete messages for which replicas may be held at the replica locations. All changes recorded in these work tables since the most recent prior call to the subroutine described in FIG. 18 are collected into "consistency set" indicated by the timestamp, or version number, associated with the changes in each set. In response to an entry (Block 1801), the subroutine defines a change set of portions of the source database equal to the earliest consistency set in the union of the CHANGE table and CHANGEDMSG table and determines the timestamp for the change set (Block 1802). Next, a query is defined which identifies all responses in the DEPENDMSG table potentially affected by the change set (Block 1803). In the preferred implementation, this is effected by the join of the CHANGE and the DEPENDMSG tables. A loop extracts the individual elements resulting from this query to identify candidate responses that may be obsolete. Each candidate response is recorded in a list by its request key MSG_ID (Block 1804).

If the request keys MSG_ID are chosen to be algorithmically related to the hash codes DB_ID by the application developer, a user exit routine which expresses this relationship may be supplied and used instead of the table—or some combination of the mapping may be supplied by the DEPENDMSG table and some by the exit routine, so long as the two together are comprehensive. Based on the candidate response list generated in Block 1804, the old version of each candidate response is retrieved from the server cache (Block 1805) or generated if there is no server cache. This selection or generation is effected using the mechanism of FIG. 4, where the version number (timestamp) supplied corresponds to an instant prior to the timestamp for the new version. Next, a new version of each candidate response is generated from the source data along with the timestamp for this new version (Block 1806). The old version and the new version are compared to determine whether any change has occurred. If a change has occurred, then the request key MSG_ID is entered into a responses changed list (Block 1807).

For each request key in the CHANGEDMSG table, an entry is added to the BADMESSAGES table for every replica location listed in the USERIDS table (Block 1808).

For each request key in the response changed list defined in Block 1807, the system adds the request key MSG_ID and timestamp to the BADMESSAGES table for each replica location listed in the USERIDS table (Block 1809), unless an identical entry is already present.

Although not shown in the Figure, entries to the BADMESSAGES table for changes to take effect in the future are processed as follows. Based on the responses changed list generated in Block 1804 and if the prior BADMESSAGES table contains entries for timestamps greater than the timestamp of the present change (indicating changes to take effect in the future), further entries to the BADMESSAGES table are made. For each request key in the candidate response list, the new response identified above is compared to the value responsive to same request key and the earliest future change timestamp. If these two values differ, an entry is added to the BADMESSAGES table for the indicated future change timestamp, the request key in question and each replica location USER_ID in the USERIDS table.

Also, for each request key in the responses changed list defined in Block 1807, if there are changes recorded to take effect in the future, the systems adds the request key MSG-ID in the BADMESSAGES table together with the timestamp of the earliest future change for each replica location listed in the USERIDS table.

If any problems occur during the subroutine then it is decommitted to prevent any loss of data (Block 1810).

Last, the processed entries are dropped from the CHANGE table and the CHANGEDMSG table (Block 1811). If the two tables are not empty, then the subroutine returns to Block 1801 to generate a new set of changes to be stored to the BADMESSAGES table (Block 1812). When the tables are empty, then the storage management clears the worklist for subsequent use (Block 1813).

IV. Conclusion

The foregoing describes a method for managing and propagating source data changes to replica locations throughout a distributed network of processors. The invention provides for the management of versions of data objects to preserve consistency of views throughout the system for individual replica locations. Further, the maintenance of obsolescence data in the invalidation manager and the use of an atomic demand/response transaction format provides failsafe operation under all service disruptions and allows processing overhead to occur at periods of minimal cost.

According to the present invention, impact calculation can be performed within a delivery subsystem that serves a variety of source databases within a distributed information service in which each replica location and each workstation is autonomous, connecting to the network and sending requests, including those concerned with obsolescence, at times that need not be related to activity at other locations. Further, complex mappings from a source database to replicas of responses stored at remote locations can be served efficiently using hash codes based on response generator's query predicates in a manner that captures the effects of all future changes to the source database, including future insertions.

The foregoing description of an embodiment of the invention has been provided for the purposes of example and description. Those skilled in the art will understand that many variations and modifications can be made to the embodiment described that fall within the spirit and scope of the invention. It is intended that the scope of the invention be limited only by the claims set forth below.

We claim:

1. In a system for managing obsolescence of replicas of data objects, the objects being utilized in multiple nodes of a distributed processing system having at least one node operating as a source location having access to a source database containing data objects and at least one node operating as an object replica location having means for storing replicas of requested data objects received from a source location, each source data object being alterable whereby a change in a source data object will cause an impact to its replicas, a method for calculating the impact of a change to a source data object within the system, comprising the steps at the source location of:
   (a) responsive to the change in the source data object, assigning a version number to the change and generating an identifier of a portion of the source database affected by the change;
   (b) responsive to said identifier, generating a list of replicas including objects from the affected portion of the source database; and
   (c) for a replica location in communication with the source location, recording a bad messages table of replicas in the list along with the version number assigned to the change for communication to the replica location.

2. The method of claim 1, wherein said step of generating a list of replicas formed from the affected portion of the source database includes the steps of:
   (a) maintaining for replicas supplied to replica locations a where used list of identifiers of portions of the source database used to form respective ones of said replicas; and
   (b) extracting the list of replicas including objects from the affected portion of the source database from the where used list.

3. The method of claim 1, wherein the version number is assigned as a function of a timestamp.

4. The method of claim 1, further including the steps of:
   (a) maintaining a list of replica locations in communication with the source location; and
   (b) wherein the step of recording a bad messages table is repeated for each replica location in the list of replica locations.

5. The method of claim 1, wherein said identifier is a hash code based on a request identifying portions of the source database intended to be used in generating a replica.

6. The method of claim 1, wherein said identifier includes at least a portion of a request identifying portions of the source database intended to be used in generating a replica.

7. In a system for managing obsolescence of replicas of data objects, the objects being utilized in multiple nodes of a distributed processing system having at least one node operating as a source location having access to a source database containing data objects and at least one node operating as an object replica location having means for storing replicas of requested data objects received from a source location, each source data object being alterable whereby a change in a source data object will cause an impact to its replicas, a method for calculating the impact of a change to a source data object within the system, comprising the steps at the source location of:
   (a) maintaining a list of replica locations in the system;
   (b) responsive to the change in the source data object, assigning a version number to the change, generating a set of identifiers of portions of the source database affected by the change and entering the version number and set of identifiers in a change table.
   (c) maintaining a where used table listing replicas supplied to replica locations and sets of identifiers of portions of the source database including objects used to form said replicas listed in the where used table;
   (d) joining the change table and where used table to generate a work table keyed by the version number associated with the change of replicas for those identifiers in the where used table that also occur in the change table; and
   (e) generating a bad message table associating the replica locations in the list of replica locations with entries in said work table generated in step (d).

8. The method of claim 7, further including the step of:
   (a) responsive to several changes in the source database that are indicated to take effect as an atomic transaction, associating an identical version number with each of the several changes and respective entries in said bad messages table generated in step (e) of claim 7.

9. The method of claim 7 or 8, further including the step of:
   (a) deleting from said change table identifiers of portions of the source database successfully processed to create entries in the bad messages table.

10. The method of claim 7, further including after the step of joining the change table and the where used table the step of:
    (a) deleting any duplicate entries in said work table generated in step (d) of claim 7.

11. The method of claim 7, further including after the step of joining the change table and the where used table the steps of:
    (a) generating a new version of each replica in said work table generated in step (d) of claim 7 that includes the change indicated by the version number associated with the replica;
    (b) generating an old version of each replica in said work table that excludes the change indicated by the version number associated with the replica; and (c) deleting replicas from said work table if the old version and the new version of such replicas are identical.

12. The method of claim 11, further including, prior to the deleting step (c), the steps of:
   (a) for each version number in the bad messages table indicating a change to take effect in a future time, generating a future version including said change in said future time of each replica in the work table; and
   (b) adding an entry to the bad messages table associating the version number indicating the change to take effect in said future time with replicas in the work table if the future version differs from the new version generated in step (a) of claim 11.

13. The method of claim 11, further including prior to the step of deleting the steps of:
   (a) generating a newer version of each replica in the work table that includes all changes up to and including changes associated with a version number indicating a future change, the version number indicating a future change being found in the bad messages table;
   (b) adding the replica in question to the bad messages table together with the future change version number if the new version in step (a) of claim 11 differs with the new version generated in step (a).

14. The method of claim 7, wherein the version number is assigned as a function of a timestamp.

15. The method of claim 7, wherein an identifier is generated as a hash code based on a request identifying portions of the source database intended to be used in generating a replica.

16. The method of claim 7, wherein said identifier includes at least a portion of a request identifying portions of the source database intended to be used in generating a replica.

* * * * *